United States Patent Office 3,475,464
Patented Oct. 28, 1969

3,475,464
PROCESS FOR THE PREPARATION OF STEROIDS
AND NOVEL INTERMEDIATES THEREOF
Otto Halpern, Palo Alto, Calif., assignor to Syntex Corporation, Panama, Panama, a corporation of Panama
No Drawing. Filed Nov. 7, 1966, Ser. No. 592,256
Int. Cl. C07c 167/14, 167/00, 169/36
U.S. Cl. 260—397.4       6 Claims

ABSTRACT OF THE DISCLOSURE

Process useful for the preparation of 3-keto-$\Delta^4$ steroids which involves the steps of oxidizing a 3β-hydroxy-5β steroid to the corresponding 3-keto-5β steroid, acetylating the keto steroid to the 3-acetoxy-$\Delta^3$-5β steroid, treating this compound with the additionally novel step of brominating with a positive bromine atom releasing agent to provide the corresponding 3-keto-4-bromo-5β steroid and dehydrobrominating the bromo steroid to the product. Also taught is the novel compound 3,17α-diacetoxy-5β-pregn-3-en-20-one which is useful as an intermediate in the disclosed process.

---

This invention relates to the preparation of steroids, more particularly, 3-keto-$\Delta^4$ steroids.

The novel process of the present invention by which these steroids are prepared is illustrated by the following transformation representing several steps which are outlined in more detail hereinafter.

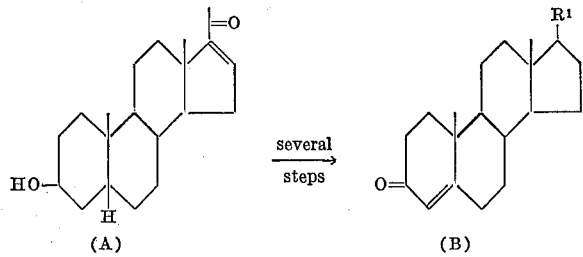

In the above transformation, $R^1$ is a keto group or the grouping $$\underset{\cdots R^3}{\overset{OR^2}{|}}$$

in which $R^2$ is hydrogen, tetrahydrofuran-2-yloxy, tetrahydropyran-2-yloxy, cyclopentyloxy, or hydrocarbon carboxylic acyl of less than 12 carbon atoms and $R^3$ is hydrogen, (lower)alkyl, (lower)alkenyl, (lower)alkynyl, or halo(lower)alkynyl or the grouping $$\begin{array}{c} CH_2R^4 \\ | \\ C=O \\ | \\ \cdots R^5 \end{array}$$

in which each of $R^4$ and $R^5$, independent of the other, is hydrogen, hydroxy, hydrocarbon carboxylic acyloxy of less than 12 carbon atoms, or when taken together with the 20-keto group, 17α,20;20,21-bismethylenedioxy.

In the above definitions, the terms (lower)alkyl, (lower)alkenyl, (lower)alkynyl, and halo(lower)alkynyl refer to monovalent branched or straight chain hydrocarbon radicals containing 6 or less carbon atoms. Thus, examples of such (lower)alkyl groups are methyl, ethyl, propyl, butyl and hexyl; of such (lower)alkenyl groups are vinyl, allyl, and the like; of such (lower)alkynyl groups are ethynyl, propynyl, hexynyl, and the like; and of such halo(lower)alkynyl groups are chloroethynyl, fluoroethynyl, bromoethynyl, and the like.

The acyl and acyloxy groups referred to above are derived from hydrocarbon carboxylic acids containing less than 12 carbon atoms which can be saturated, unsaturated, aromatic and of branched, straight, cyclic, or cyclic-aliphatic chain structure. In addition, they can be substituted by functional groups, such as hydroxy, alkyloxy containing up to 6 carbon atoms, acyloxy containing up to 12 carbon atoms, nitro, amino, or halogen. Typical ester groups thus included are acetate, dichloroacetate, trichloroacetate, trimethylacetate, t-butylacetate, phenoxyacetate, aminoacetate, propionate, cyclopentylpropionate, β-chloropropionate, γ-phenylpropionate, butyrate, caproate, enanthate, decanoate, benzoate, adamantoate, and the like.

In accordance with the present invention and with reference to the above depicted transformation, starting compound 5β-pregn-16-en-3β-ol-20-one (A) is produced via conventional degrative procedures from smilagenin, a 5β-saturated sapogenin which procedures involve acetylation to give the corresponding furostene diacetate compound, oxidation of this diacetate, and hydrolysis of the oxidation product.

The thus formed starting compound (A) is transformed to the product androstanes and pregnanes (B) via a sequence of procedures varying according to the particular compound desired. The processes involved in these transformations are as follows.

The 3-keto-$\Delta^4$ functional system can be introduced prior to or simultaneously with further elaboration at the C-17 position depending upon choice and the particular product steroids to be prepared. One preferred method involves prior hydrogenation of the $\Delta^{16}$ unsaturation of starting compound (A) followed by introduction of the A ring functionality. Thereafter, appropriate C-17 elaboration can be provided. Generally the 3-keto-$\Delta^4$ system is introduced according to the following preferred novel reaction scheme using partial formulas for the sake of convenience and simplicity.

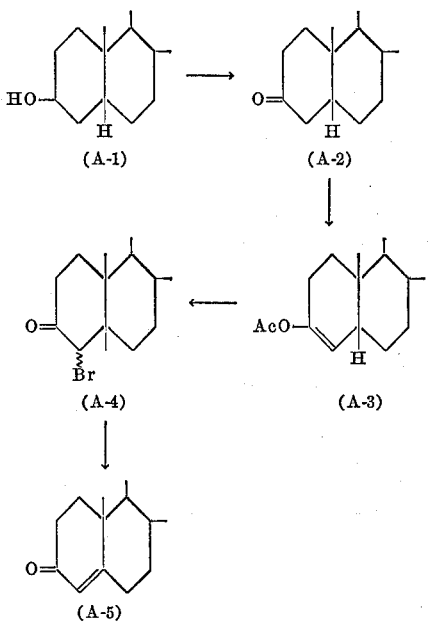

In the above scheme, Ac represents an acyl group, such as acetoxy, and the wavy line (⌇) embraces both the alpha and beta configuration.

In this latter reaction scheme, a 3β-hydroxy-5β steroid (A–1) corresponding to compound (A) depicted and prepared as described above, is oxidized to the 3-keto-5β derivative (A–2) such as with N-bromoacetamide in organic solvent. The oxidized product is acylated such as with an acidified acetic anhydride mixture to give, as the predominant product, the 3-acetoxy-Δ³ derivative (A–3). Thereafter, the acylated derivative is brominated such as with N-bromoacetamide affording (A–4) which is, in turn, dehydrobrominated in basic organic solution giving the product 3-keto-Δ⁴ compound (A–5). Thus, for example, 5β-pregnan-3β-ol-20-one can be used to prepare pregn-4-ene-3,20-dione.

Alternatively, a 3β-acyloxy-5β steroid can be used as a starting compound with identical results.

The preparation of those compounds represented by Formula B above in which $R^1$ is the grouping $$\begin{matrix} CH_2R^4 \\ | \\ C=O \\ | \\ \cdots R^5 \end{matrix}$$

in which each of $R^4$ and $R^5$ is as hereinbefore defined, that is, 3-keto-Δ⁴ steroids belonging to the pregnane series, is performed via selected procedures known per se. Thus, the Δ¹⁶ unsaturated bond can be hydrogenated initially to the saturated linkage and, after the 3-keto-Δ⁴ system is introduced, a 17α-hydroxy group provided by sequential treatment with acetic anhydride, peracid, and strong base. The 17α-hydroxyl can be acylated such as with acetic anhydride in the presence of p-toluenesulfonic acid.

The C–21 elaboration is similarly provided via individually known methods. The 21-acetoxy group is introduced such as by treating the 21-unsubstituted carbon with iodine and calcium oxide followed by potassium acetate. This ester moiety can be hydrolyzed to the corresponding alcohol.

Various other acyloxy groups are conventionally introduced in either of the C–17α and C–21 positions. Alternatively, the 17α,21-dihydroxy-20-keto system can be etherified to the 17α,20;20,21-bismethylenedioxy grouping by treatment with formaldehyde in the presence of acid.

The androstane derivatives represented by Formula B above, that is, those compounds in which $R^1$ is the grouping $$\begin{matrix} OR^2 \\ | \\ \cdots R^3 \end{matrix}$$

with $R^2$ and $R^3$ being as defined above, are prepared from the corresponding pregnane compounds via known degradation procedures. The 17α,21-dihydroxy-20-keto compound, prepared as described above, is converted to the corresponding 17-keto compound by treatment thereof with sodium bismuthate in aqueous acetic acid, preferably at room temperature. Thereafter, the 17-keto function can be conventionally elaborated.

In this latter elaboration, the 17-keto group is treated with an organometallic reagent to give the 17α-aliphatic-17β-ols. Alternatively, the 17-keto group is reduced to the 17α-unsubstituted-17β-ols. The thus obtained hydroxyl groups are thereafter esterified and etherified giving the corresponding 17β-esters and -ethers contemplated. During this elaboration, it is preferable that the 3-keto group, if present initially, be selectively protected such as by conversion thereof to the 3-enol ether or 3,3-ethylenedioxy grouping. Acid hydrolysis restores the 3-keto group after desired elaboration at C–17 is concluded.

One particularly valuable synthesis of the present invention resides in the novel preparation of 17α-acetoxyprogesterone from 5β-pregn-16-en-3β-ol-20-one (obtainable from smilagenin as described above). This particular embodiment further illustrates the novel process of the instant invention and can be represented as follows:

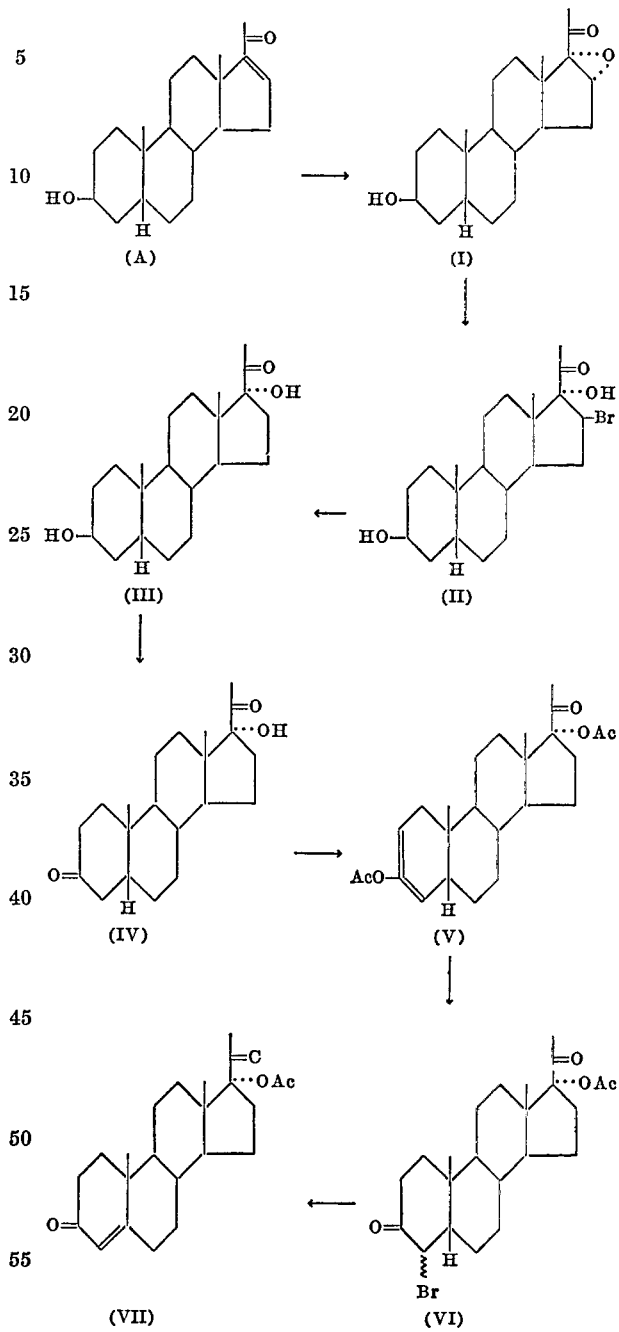

wherein Ac is acetyl and the wavy line (⌇) includes both the alpha and beta configurations.

Referring to the reaction scheme just depicted, the compound represented by Formula A is also illustrated hereinabove and the product 17α - acetoxyprogesterone (VII) corresponds to the compound represented by Formula B hereinabove in which latter structural formula $R^1$ is the grouping $$\begin{matrix} CH_2R^4 \\ | \\ C=O \\ | \\ \cdots R^5 \end{matrix}$$

in which $R^4$ is hydrogen and $R^5$ is acetoxy.

The degradation product (A) is epoxidized with hydrogen peroxide in sodium hydroxide solution giving 3β-hydroxy-16,17-oxido-5β-pregnane (I). This compound is thereafter treated with hydrobromic acid giving the corresponding 16β-bromo-17α-hydroxy derivative (II). The debromination of the halohydrin (II) by treatment with palladium-on-charcoal and ammonium acetate yields the corresponding 3β,17α-dihydroxy compound (III) which is selectively oxidized to the 3-keto-17α-hydroxy-5β-pregnane (IV) such as with N-bromoacetamide in organic solvent.

Vigorous acetylation of the thus prepared 5β-pregnan-17α-ol-3-one (IV) affords 3β,17α-diacetoxy-5β-pregn-3-en-20-one (V) which, upon bromination with N-bromoacetamide or the like, is converted to the 4-bromo compound (VI). Dehydrobromination with base affords the product derivative, 17α-acetoxyprogesterone (VII).

The foregoing procedure thus sets forth a novel method for introducing the valuable 3-keto-$\Delta^4$ functional system in the preparation of a useful pregnane steroid utilizing a degradation product of the sapogenin smilagenin as the starting material. In this particular embodiment, the 3-keto-$\Delta^4$ grouping is introduced simultaneously with further elaboration at the C–17 position, that is, the insertion of the 17α-acetoxy group replacing the $\Delta^{16}$-unsaturation.

The 3-keto-$\Delta^4$ compounds thus produced hereby are useful compounds per se or, as has been hereinbefore mentioned, are convertible to useful steroids. Further to those elaborations, the 6-chloro-$\Delta^6$ system can be introduced in the foregoing derivative, 17α-acetoxyprogesterone, to give a correspondingly valuable compound. Similarly, $\Delta^1$-unsaturation and the usual important and valuable substitution at various parts of the steroid nucleus can be provided to give 3-keto-$\Delta^4$ derivatives which are also highly active physiological agents.

In the above depicted novel process, the bromination step by which the 3-keto-4-bromo-5β compounds are prepared from the corresponding 3β-acyloxy-$\Delta^3$-5β compounds is itself a novel process of the present invention. In this process, the 3β-acyloxy-$\Delta^3$-5β steroid is treated with a positive bromine atom releasing agent such as N-bromoamide or -imide, for example, N-bromoacetamide, N-bromosuccinimide, and the like, preferably in aqueous organic solvent such as an aqueous solution of ketone, for example acetone, and the like. The reaction is satisfactorily conducted at room temperature; however, temperatures other than, but in the range of, room temperature such as from about 0° C. to 60° C. can be employed depending primarily upon the choice of solvent. Similarly the duration of reaction is variable; the reaction usually being substantially complete within one hour.

The following examples illustrate the manner by which this invention can be practiced and are not to be construed as limitations upon the overall scope hereof, but rather as illustrations thereof.

PREPARATION

Ten grams of smilagenin and 40 ml. of acetic acid are heated at 195° C. for 5 hours in a sealed tube. The contents of the tube are then transferred to an Erlenmeyer flask and water is added cautiously. This mixture is heated for 30 minutes at steam bath temperatures, cooled to 15° C. and treated under stirring with 50 ml. of a solution obtained by adding 4.2 g. of chromium trioxide to 54.5 ml. of 90% acetic acid. The reaction mixture is stirred for 30 minutes and then treated with sodium bisulfite solution to destroy excess reagent. The mixture is poured into water and extracted with ethyl acetate. These extracts are washed with water, sodium bicarbonate solution and water to neutrality, dried and evaporated to dryness. The residue is heated at reflux for 5 hours with 500 ml. of 60% acetone containing 5 g. of potassium hydroxide, and then poured into water and extracted with ethyl acetate. The aqueous layer is acidified and extracted with ethyl acetate and these extracts are dried over sodium sulfate and evaporated to dryness to yield 5β-pregn-16-en-3β-ol-20-one.

Example 1

A solution of 2.0 g. of 5β-pregn-16-en-3β-ol-20-one in 100 ml. of ethyl acetate is hydrogenated with 0.1 g. of platinum oxide catalyst until the theoretical amount of hydrogen is consumed. The catalyst is removed by filtration and the filtrate is evaporated to dryness to yield 5β-pregnan-3β-ol-20-one which may be further purified by recrystallization from acetone:hexane.

Example 2

A solution of 4.73 g. of 5β-pregnan-3β-ol-20-one in 47.3 ml. of dioxane is cooled to 15° C. A solution of 4.73 g. of N-bromoacetamide in 17.2 ml. of water and 7 ml. of dioxane is added to the steroid solution. The mixture is allowed to stand for 30 minutes in the absence of light at between 15° C. and 20° C. Thereafter, excess N-bromoacetamide is decomposed by the slow addition of a 10% sodium bisulfite solution. The resultant mixture is diluted with 250 ml. of water after which time the precipitate is filtered, washed with water, and dried giving 5β-pregnane-3,20-dione.

Example 3

A solution of 4.45 g. of 5β-pregnane-3,20-dione in 111 ml. of a solution prepared from .05 ml. of 70% perchloric acid, 4.8 ml. of acetic anhydride, and 50 ml. of ethyl acetate is kept at room temperature for 30 minutes. Thereafter, 40 ml. of saturated sodium bicarbonate solution is added and the mixture is vigorously shaken for 3 minutes. The organic layer is separated and washed again with 40 ml. of a saturated sodium bicarbonate solution. The combined organic extracts are dried over sodium sulfate and evaporated to dryness under vacuum giving 3-acetoxy-5β-pregn-3-en-20-one.

Example 4

To a solution of 5.8 g. of 3-acetoxy-5β-pregn-3-en-20-one in 55 ml. of acetone is added a mixture containing 2 g. of N-bromoacetamide and 18.2 ml. each of water and acetone. The suspension is allowed to stand at room temperature for 25 minutes after which time the excess N-bromoacetamide is decomposed by the slow addition of a sodium bisulfite solution. The resultant suspension is diluted with 100 ml. of water, the mixture is filtered, washed with 40 ml. of water, and dried to give 4-bromo-5β-pregnane-3,20-dione.

Example 5

A suspension of 3.33 g. of sodium bromide and 1.67 g. of sodium bicarbonate in 45 ml. of dimethylacetamide is heated to 100° C. over a nitrogen atmosphere with vigorous stirring during which time 5.65 g. of 4-bromo-5β-pregnane-3,20-dione is added. The stirring is continued for 5 additional hours under nitrogen while maintaining the temperature between 40° C. and 95° C. After the suspension is allowed to cool to room temperature, it is filtered, washed with water, and dried. The filtrate is slowly poured into 400 ml. of a saturated sodium chloride solution with stirring and the resultant precipitate is collected and washed with 100 ml. of water. Thereafter, the filtered solid is dissolved in 20 ml. of chloroform, the water layer is separated and the organic layer dried over sodium sulfate and evaporated to dryness giving pregn-4-ene-3,20-dione which is recrystallized from acetone.

Example 6

To a solution of 8.5 g. of 5β-pregn-16-en-3β-ol-20-one in 560 ml. of methanol are added 14.8 ml. of a 4 N sodium hydride solution and 33.6 ml. of a 30% hydrogen peroxide solution. After stirring at room temperature for 3 hours, the excess hydrogen peroxide is decomposed by the careful addition of a 3% aqueous potassium permanganate solution. The resultant suspension is refluxed for 2 hours. After cooling, the solution is acidified with about 25 ml.

of a 10% aqueous acetic acid solution to pH 5. Sulfur dioxide gas is bubbled into the stirred suspension until it becomes colorless, after which time it is concentrated in vacuum to about 150 ml. volume and then diluted with 150 ml. of water. The precipitate is filtered, washed with water, and dried giving 16α,17α-oxido-5β-pregnan-3β-ol-20-one.

To a stirred suspension of 7.3 g. of 16α,17α-oxido-5β-pregnan-3β-ol-20-one in 56 ml. of methylene chloride is added dropwise over a period of about 10 minutes 4.9 ml. of a 30% solution of hydrobromic acid in acetic acid. Stirring is continued for a total of 35 minutes and the solution is poured into ice water and stirred an additional 10 minutes. The separated crystalline material is filtered, washed with water, and dried giving 16β-bromo-5β-pregnane-3β,17α-diol-20-one.

To a solution of 7.12 g. of 16β-bromo-5β-pregnane-3β,17α-diol-20-one in 175 ml. of methanol is cautiously added .71 g. of 5% palladium-on-charcoal over a nitrogen atmosphere while maintaining vigorous agitation. Ammonium acetate (1.33 g.) is added and a slight positive pressure of hydrogen is applied. After the theoretical amount of hydrogen has been absorbed the suspension is filtered and washed with 10 ml. of hot methanol. The combined filtrate and washings are concentrated to about 35 ml. volume under vacuum, the concentrate being diluted with ice water giving a crystalline material which is filtered, washed with water, and dried to yield 5β-pregnane-3β,17α-diol-20-one.

Thereafter, the product 5β-pregnane-3β,17α-diol-20-one is treated according to the procedure set forth in Example 2 to give 5β-pregnan-17α-ol-3,20-dione which is treated according to the procedure set forth in Example 3 to give 3,17α-diacetoxy-5β-pregn-3-en-20-one which is treated according to the procedure set forth in Example 4 to give 4-bromo-17α-acetoxy-5β - pregnane - 3,20 - dione which is treated according to the procedure set forth in Example 5 to give as the final product 17α-acetoxypregn-4-ene-3,20-dione.

Example 7

A solution of 0.17 g. of potassium hydroxide in 0.2 ml. of water and 2.5 ml. of methanol is added over 30 minutes to a refluxing solution of 1 g. of 17α-acetoxypregn-4-ene-3,20-dione in 30 ml. of methanol under nitrogen. The solution is refluxed for 2 hours, cooled, neutralized with acetic acid and concentrated under reduced pressure. After the addition of water, the solid which forms is collected by filtration and dried to yield pregn-4-en-17α-ol-3,20-dione which is recrystallized from acetone:hexane.

Example 8

To a stirred, cooled solution of 4 g. of pregn-4-ene-3,20-dione in 30 ml. of tetrahydrofuran and 18 ml. of methanol is first added in small portions 6 g. of pure calcium oxide and then 6 g. of iodine. Stirring at room temperature is continued until the solution becomes a pale yellow. The mixture is then poured into ice-water containing 18 ml. of acetic acid and 2 g. of sodium thiosulfate. After stirring for 15 minutes, the solution is decanted and the solid collected by filtration to yield 21-iodopregn-4-ene-3,20-dione. This compound is mixed with 80 ml. of acetone and 12 g. of recently fused potassium acetate. This mixture is refluxed for 8 hours and then concentrated to a small volume, diluted with water and extracted with ethyl acetate. The ethyl acetate extracts are washed with water, dried over sodium sulfate and concentrated until crystallization occurs. The solid is collected and recrystallized from methanol:water to yield 21 - acetoxypregn - 4 - ene - 3,20-dione.

Example 9

To a stirred, cooled solution of 4 g. of 17α-acetoxypregn-4-ene-3,20-dione in 30 ml. of tetrahydrofuran and 18 ml. of methanol is first added in small portions 6 g. of pure calcium oxide and then 6 g. of iodine. Stirring at room temperature is continued until the solution becomes a pale yellow. The mixture is then poured into ice-water containing 18 ml. of acetic acid and 2 g. of sodium thiosulfate. After stirring for 15 minutes, the solution is decanted and the solid collected by filtration to yield 17α-acetoxy-21-iodopregn-4-ene-3,20-dione. This compound is mixed with 80 ml. of acetone and 12 g. of recently fused potassium acetate. This mixture is refluxed for 8 hours and then concentrated to a small volume, diluted with water and extracted with ethyl acetate. The ethyl acetate extracts are washed with water, dried over sodium sulfate and concentrated until crystallization occurs. The solid is collected and recrystallized from methanol:water to yield 17α,21-diacetoxypregn-4-ene-3,20-dione.

Base hydrolysis yields pregn-4-ene-17α,21 - diol - 3,20-dione.

Example 10

To a solution of 5 g. of pregn-4-ene-17α,21-diol-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 17α, 20;20,21-bismethylenedioxypregn-4-en-3-one which is recrystallized from methanol:ether.

Example 11

To a stirred solution of 1 g. of pregn-4-ene-17α,21-diol-3,20-dione in 35 ml. of glacial acetic acid and 35 ml. of water is added 13.5 g. of sodium bismuthate. The mixture is stirred for 30 mintues at room temperature and 135 ml. of water are then added. The mixture is cooled to 0° C., partially neutralized by the addition of 140 ml. of 3 N potassium hydroxide and extracted with benzene. These extracts are dried and evaporated to yield androst-4-ene-3,17-dione which is recrystallized from acetone:ether.

Example 12

To a solution of 1 g. of androst-4-ene-3,17-dione in 30 ml. of acetic acid is added 0.5 ml. of 2 N hydrochloric acid. The mixture is allowed to stand 5 hours at room temperature and then diluted with ice water and extracted with methylene chloride. The extracts are washed with water to neutrality, dried over sodium sulfate and evaporated to dryness to yield 3-ethoxyandrosta-3,5-dien-17-one which is recrystallized from acetone:hexane.

A solution of 1 g. of sodium borohydride in 3 ml. of water is added to an ice-cooled solution of 1 g. of 3-ethoxyandrosta-3,5-dien-17-one in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3-ethoxyandrosta-3,5-dien-17β-ol which may be furthre purified by recrystallization from acetone:hexane.

To a solution of 1 g. of 3-ethoxyandrosta-3,5-dien-17β-ol in 10 ml. of acetone are added a few drops of 36% hydrochloric acid. The mixture is heated a few minutes at steam bath temperatures, diluted with water and filtered. The solid thus collected is dried and recrystallized from acetone:hexane to yield androst-4-en-17β-ol-3-one.

Example 13

A mixture of 1 g. of androst-4-en-17β-ol-3-one, 4 ml. of pyridine, and 2 ml. of acetic anhydride is allowed to stand at room temperature for 15 hours. The mixture is then poured into ice water and the solid which forms is collected by filtration, washed with water and dried to yield 17β-acetoxyandrost-4-en-3-one which may be further purified through recrystallization from acetone: hexane.

A solution of 1 gram of androst-4-en-17β-ol-3-one in 10 ml. of pyridine is treated with 7.5 molar equivalents of benzoyl chloride. The mixture is allowed to stand at room temperature for 15 hours, then diluted with water, and extracted with methylene chloride. The extracts are washed with water to neutrality, dried and evaporated. The residue is chromatographed on neutral alumina, eluting with ether:hexane to yield 17β-benzoyloxyandrost-4-en-3-one which is recrystallized from acetone:hexane.

Similarly, 17β-propionyloxyandrost-4-en-3-one, 17β-(3-phenylpropionyloxy)androst-4-en-3-one, 17β-adamantoyloxyandrost-4-en-3-one, 17β-dichloroacetoxyandrost-4-en-3-one, and 17β-decanoyloxyandrost-4-en-3-one are prepared from androst-4-en-17β-ol-3-one and the appropriate acid chloride.

Example 14

Two milliliters of dihydropyran are added to a solution of 1 g. of androst-4-en-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 17β-tetrahydropyran-2-yloxyandrost-4-en-3-one which is recrystallized from pentane.

Two milliliters of dihydrofuran are added to a solution of 1 g. of androst-4-en-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 17β-tetrahydrofuran-2-yloxyandrost-4-en-3-one which is recrystallized from pentane.

A solution of one chemical equivalent of androst-4-en-17β-ol-3-one in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 mintues. The mixture is allowed to reflux for 20 hours after which time the precipitate of sodium bromide is removed by filtration and the organic phase dried and evaporated to yield 17β-cyclopentyloxyandrost-4-en-3-one which is further purified upon recrystallization from pentane.

Example 15

A solution of 5 g. of 3-ethoxyandrosta-3,5-dien-17-one in 250 ml. of thiophene-free benzene is treated with 27.5 ml. of 4 N methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 3-ethoxy-17α-methylandrosta-3,5-dien-17β-ol which is recrystallized from methylene chloride:hexane.

Acid hydrolysis following the procedure outlined in the third paragraph of Example 12 above, affords 17α-methylandrost-4-en-17β-ol-3-one.

To a stirred solution of 2 g. of 3-ethoxyandrosta-3,5-dien-17-one in 250 ml. of absolute ether is added in a dropwise fashion and under nitrogen, an ethereal solution of 10 molar equivalents of ethyl lithium. The mixture is then stirred for 48 hours at room temperature, poured into water, acidified with hydrochloric acid and stirred vigorously for one hour. The ethereal phase is separated, washed with water to neutrality, dried over sodium sulfate and evaporated to dryness to yield 3-ethoxy-17α-ethylandrosta-3,5-dien-17β-ol which is further purified through recrystallization from acetone:hexane.

Acid hydrolysis yields 17α-ethylandrost-4-en-17β-ol-3-one.

A solution of 1 g. of 3-ethoxyandrosta-3,5-dien-17-one in 30 ml. of anhydrous benzene is added under nitrogen to a solution of 1.4 g. of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 3-ethoxy-17α-ethynylandrosta-3,5-dien-17β-ol which is recrystallized from acetone:hexane.

Acid hydrolysis yields 17α-ethynylandrost-4-en-17β-ol-3-one.

A solution of 8.5 g. of 1,2-dichloroethylene in 50 ml. of anhydrous ether is added in a dropwise fashion, under nitrogen and at 0° C., over a 30 minute period to a stirred solution of 15 ml. of 1.4 N methyl lithium in anhydrous ether. After stirring for an additional 90 minutes at room temperature, a solution of 0.5 g. of androst-4-en-17β-ol-3-one in 20 ml. of anhydrous ether is added in a dropwise fashion with stirring over a 15 minute period. Stirring at room temperature is continued for 18 hours, and the reaction mixture is then poured into ice water and extracted with ether. These extracts are washed with water, dried over sodium sulfate and concentrated under reduced pressure. The residue is chromatographed on alkaline alumina with 8:2 hexane:ether to yield 3-ethoxy-17α-chloroethynylandrosta-3,5-dien-17β-ol which may be recrystallized from methanol.

Acid hydrolysis yields 17α-chloroethynylandrost-4-en-17β-ol-3-one.

The 17α-aliphatic-17β-ol compounds prepared as described in the instant example are esterified and etherified at the 17β-position following the procedures set forth in Examples 13 and 14 above to respectively yield 17α-methyl-17β-acetoxyandrost-4-en-3-one,
17α-methyl-17β-benzoyloxyandrost-4-en-3-one,
17α-ethyl-17β-acetoxyandrost-4-en-3-one,
17α-ethyl-17β-benzoyloxyandrost-4-en-3-one,
17α-ethynyl-17β-acetoxyandrost-4-en-3-one,
17α-ethynyl-17β-benzoyloxyandrost-4-en-3-one,
17α-chloroethynyl-17β-acetoxyandrost-4-en-3-one,
17α-chloroethynyl-17β-benzoyloxyandrost-4-en-3-one, as well as the corresponding 17β-propionyloxy, -(3-phenyl-propionyloxy), -adamantoyloxy, -dichloroacetoxy, and -decanoyloxy esters thereof, and 17α-methyl-17β-tetrahydropyran-2'-yloxyandrost-4-en-3-one,
17α-methyl-17β-tetrahydrofuran-2'-yloxyandrost-4-en-3-one,
17α-methyl-17β-cyclopentyloxyandrost-4-en-3-one,
17α-ethyl-17β-tetrahydropyran-2'-yloxyandrost-4-en-3-one,
17α-ethyl-17β-tetrahydrofuran-2'-yloxyandrost-4-en-3-one,
17α-ethyl-17β-cyclopentyloxyandrost-4-en-3-one,
17α-ethynyl-17β-tetrahydropyran-2'-yloxyandrost-4-en-3-one,
17α-ethynyl-17β-tetrahydrofuran-2'-yloxyandrost-4-en-3-one,
17α-ethynyl-17β-cyclopentyloxyandrost-4-en-3-one,
17α-chloroethynyl-17β-tetrahydropyran-2'-yloxyandrost-4-ene-3-one, 17α-chloroethynyl-17β-tetrahydrofuran-2'-yloxyandrost-4-en-3-one, and 17α-chloroethynyl-17β-cyclopentyloxyandrost-4-en-3-one.

What is claimed is:
1. A process which comprises
   (a) oxidizing a 3β-hydroxy-5β steroid with N-bromoacetamide in aqueous dioxane to the corresponding 3-keto-5β steroid;
   (b) acetylating the keto steroid with acetic anhydride in the presence of perchloric acid to the 3-acetoxy-Δ³-5β steroid;
   (c) brominating the 3-acetoxy-Δ³-5β steroid with a positive bromine atom releasing agent in an aqueous ketone solution to give the corresponding 3-keto-4-bromo-5β steroid; and
   (d) dehydrobrominating the bromo steroid in basic organic solution to the corresponding 3-keto-Δ⁴ steroid.

2. A process according to claim 1 wherein in part (a) thereof 5β-pregn-16-en-3β-ol-20-one is used as the starting steroid.

3. The process according to claim 2 wherein in part (d) thereof, 17α-acetoxypregn-4-ene-3,20-dione is prepared.

4. A process of preparing 3-keto-4-bromo-5β steroids which comprises treating a 3-acetoxy-Δ³-5β steroid with a positive bromine releasing agent in an aqueous ketone solution.

5. A process according to claim 4 wherein the positive bromine atom releasing agent is N-bromoacetamide.

6. 3,17α-diacetoxy-5β-pregn-3-en-20-one.

References Cited

UNITED STATES PATENTS

| | | | |
|---|---|---|---|
| 2,352,852 | 7/1944 | Marker | 260—239.55 |
| 2,880,214 | 3/1959 | Moffett et al. | 260—397.4 |

OTHER REFERENCES

Fieser et al.: Steroids (1959), pp. 678–9 relied upon.

Dusza et al.: J. Med. Chem. 6, Apr. 7, 1963, pp. 364–369.

Djerassi: Steroid Reactions (1963), pp. 120–121 and 190 relied upon.

ELBERT L. ROBERTS, Primary Examiner

U.S. Cl. X.R.

260—239.55, 397.3, 397.47

UNITED STATES PATENT OFFICE
CERTIFICATE OF CORRECTION

Patent No. 3,475,464                              Dated October 28, 1969

Inventor(s) Otto Halpern

It is certified that error appears in the above-identified patent and that said Letters Patent are hereby corrected as shown below:

Column 4, lines 5 through 55, the formula in the right column, the third from the top, should appear as follows:

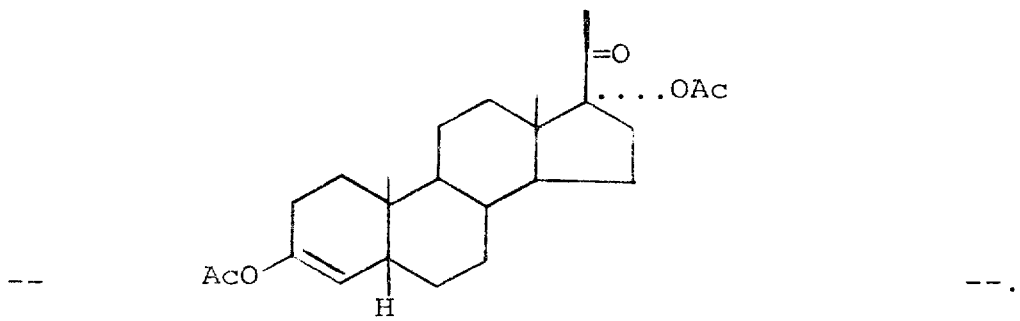

(V)

Column 10, lines 29 and 30, cancel "androst-4-en-17β-ol-3-one" and replace it with --3-ethoxyandrosta 3,5-dien-17-one--.

Column 10, line 57, "yl-propionyloxy" should read --ylpropionyloxy--.

SIGNED AND
SEALED

JUL 7 1970

(SEAL)
Attest:

Edward M. Fletcher, Jr.

WILLIAM E. SCHUYLER, JR.
Commissioner of Patents